(12) United States Patent
Krietzman et al.

(10) Patent No.: US 8,647,050 B2
(45) Date of Patent: Feb. 11, 2014

(54) VARIABLE PARTIAL WIND WALL

(75) Inventors: Mark H. Krietzman, Palos Verdes, CA (US); William A. Farone, Irvine, CA (US); Yung Chow, Irvine, CA (US)

(73) Assignee: AeroDynEnergy, Inc., Anaheim, CA (US)

( * ) Notice: Subject to any disclaimer, the term of this patent is extended or adjusted under 35 U.S.C. 154(b) by 0 days.

(21) Appl. No.: 13/699,224

(22) PCT Filed: May 25, 2011

(86) PCT No.: PCT/US2011/037954
§ 371 (c)(1),
(2), (4) Date: Nov. 20, 2012

(87) PCT Pub. No.: WO2011/150096
PCT Pub. Date: Dec. 1, 2011

(65) Prior Publication Data
US 2013/0064644 A1 Mar. 14, 2013

Related U.S. Application Data

(60) Provisional application No. 61/348,159, filed on May 25, 2010.

(51) Int. Cl.
*F03D 11/00* (2006.01)

(52) U.S. Cl.
USPC .......................... 415/52.1; 415/95; 415/211.2

(58) Field of Classification Search
USPC ........... 415/52.1, 58.2, 58.3, 58.7, 93, 94, 95, 415/96, 148, 211.2
See application file for complete search history.

(56) References Cited

U.S. PATENT DOCUMENTS

| | | | |
|---|---|---|---|
| 4,208,168 A | 6/1980 | Chen et al. | |
| 7,112,034 B2 * | 9/2006 | Bezemer | 415/3.1 |
| 7,256,512 B1 | 8/2007 | Marquiss | |
| 2006/0244264 A1 | 11/2006 | Anderson et al. | |
| 2010/0032963 A1 | 2/2010 | Ferguson | |
| 2010/0270800 A1 * | 10/2010 | Krietzman et al. | 290/44 |

OTHER PUBLICATIONS

International Search Report from corresponding International Application No. PCT/US2011/037954, filed May 25, 2011 (4 pages).
Written Opinion from corresponding International Application No. PCT/US2011/037954, filed May 25, 2011 (4 pages).

* cited by examiner

*Primary Examiner* — Nathaniel Wiehe
*Assistant Examiner* — Adam W Brown
(74) *Attorney, Agent, or Firm* — Klein, O'Neill & Singh, LLP

(57) ABSTRACT

A wind power system including a wind turbine affixed to a support tower, and a wind deflector deployable relative to a direction of air flow and configured to control the movement of at least a portion of air flow passing through rotor blades of the wind turbine to reduce wind loads on the components of the wind turbine while maintaining the air flow in an operating power production range.

14 Claims, 4 Drawing Sheets

US 8,647,050 B2

VARIABLE PARTIAL WIND WALL

CROSS-REFERENCE TO RELATED APPLICATION

This application claims the benefit and priority of U.S. Provisional Patent Ser. No. 61/348,159, filed May 25, 2010, which is herein fully incorporated by reference for all purposes.

BACKGROUND

1. Field of the Disclosure

This disclosure pertains to devices, processes, methods and systems, which are related to, or arising from, the control of the exposure of blade surface(s) to wind, air pressure and/or air movement to generate energy.

SUMMARY

The following terms are generally understood by persons of ordinary skill in the wind power generation arts to have an ordinary meaning, which may include, or may be complemented by the meaning provided below.

As used herein "Wind" means air currents.

As used herein "Windmill" means a structure that rotates about an axis (vertical, horizontal, or compound) in response to Wind or Controlled air movement.

As used herein "Blade" means an extended element that can be displaced by wind or moving air currents.

As used herein "Pivot" means a fixture or system which supports a blade (or blades) on a base or support in a movable fashion.

Other features and advantages of the present disclosure will be set forth, in part, in the descriptions which follow and the accompanying drawings, wherein the implementations of the present disclosure are described and shown, and in part, will become apparent to those skilled in the art upon examination of the following description taken in conjunction with the accompanying drawings or may be learned by practice of the present disclosure. The advantages of the present disclosure may be realized and attained by means of the instrumentalities and combinations particularly pointed out in the disclosure and any appended claims.

DRAWINGS

Figure 1:
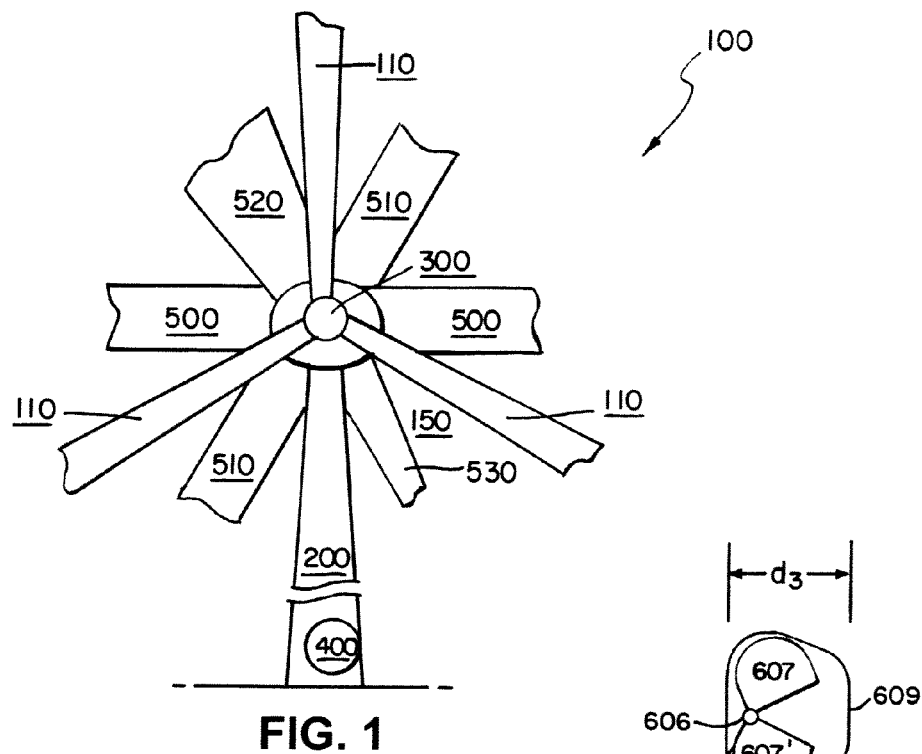
FIG. 1 is an exemplary implementation of a front partial view of a horizontal axis wind turbine (HAWT) with extendable wall members or structures.

FIGS. 6A-D are front and cut-away views of an exemplary implementation of a vertical axis wind turbine (VAWT) with a partial wall member or structures.

It should be appreciated that for simplicity and clarity of illustration, elements shown in the Figures have not necessarily been drawn to scale. For example, the dimensions of some of the elements are exaggerated relative to each other for clarity. Further, where considered appropriate, reference numerals have been repeated among the Figures to indicate corresponding elements.

FURTHER DESCRIPTION

All call outs and text in the Figures are hereby incorporated by this reference as if fully set forth herein.

A wind-energy conversion system includes at least three primary subsystems, an aerodynamic system (e.g. rotor blades and the like), the mechanical transmission system (e.g. gears, bearings and the like) and the electrical generating system. The physical configuration of the wind-energy conversion system produces an asymmetric force in the naturally occurring air currents or "wind" to control the air movement. The controlled air movements cause the physical configuration, including but not limited to flow directing structures and collectors, to rotate, oscillate or translate, thus providing a mechanical energy from which electrical power may be generated. In some instances, a physical condition may be created, such as a pressure or temperature gradient, to control the air movement and create the motion that provides the mechanical energy. If the mechanical energy is used directly by machinery, for example, to pump water, cut lumber or grind stones, the machinery is generally referred to as a windmill. If the mechanical energy is instead converted to electricity, the machinery is generally referred to as a wind generator or wind turbine.

Wind turbines, are generally classified into two groups based upon the orientation of the turbine axis of rotation: 1) horizontal axis wind turbines ("HAWT") and 2) vertical axis wind turbines ("VAWT"). The conventional HAWT used for power generation generally has up to five blades or more arranged like a propeller, mounted to a horizontal rotor or drive shaft attached to a gearbox that drives a power generator. The HAWT may be mounted on a supporting tower that maintains the HAWT a significant distance above the ground for safety purposes, and to minimize ground effects on wind flow. The gearbox is commonly used to step up the speed to drive the power generator, although some designs may directly drive an annular electric generator. Some turbines operate at a constant speed; however, more energy may be collected by using a variable speed turbine and a solid-state power converter to interface the turbine with the generator.

The conventional VAWT has blades mounted to a vertically extending rotor or drive shaft and are generally used in areas where winds constantly shift direction because the blades are not required to be rotated to face into the wind. The VAWT typically functions in areas having low winds, since it requires a slower wind speed to start generating electricity.

FIG. 1 shows a wind energy conversion system, a wind capture, power apparatus, or otherwise a renewable energy device and system 100. In one embodiment, the wind-energy conversion system 100 includes a horizontal axis wind turbine or HAWT comprising a drive or power unit 150 housed in a nacelle. The drive or power unit 150 includes components to support rotating blades 110, to turn a generator (not shown) to provide electricity and in many cases to allow for braking or lock down of the blades 110, for example, if the rotor blade rotation needs to be slowed or stopped. Such drive structures also often have a yaw control to provide for movement of the drive unit 150 around the main support structure 200. Rotor blades 110 are generally set in multiples, having 2 or more spaced blades in a balanced relationship around the drive or power unit 150. The components of the drive or power unit 150 housed within the nacelle, may include shafts, gears, belts, magnets, coils, electronics boards, circuitry, controllers and the like. These components are not shown in detail, since they are well known to those of ordinary skill in the art. Blades 110 spin or pivot causing a drive shaft of a generator to turn within the drive unit to generate electricity. A hub 300, which typically faces the wind during operation, is often affixed over the common connection point of the blades 110 to improve aerodynamics at the connection point.

Different windmill components are rated at certain speed limits. When a windmill spins or rotates at speeds in excess of the ratings, the blades 110, the generator, the shafts and other components of the drive unit 150 or the support structure 200 may be damaged due to the stress, the vibrations and other forces that may ensue.

The total wind force applied to blades 110 is the sum of the wind vectors as detailed below in this disclosure and illustrated and described in the exemplary implementations in this disclosure. The vector sum can be controlled. The wind flowing towards a turbine blade is similar to wind flowing toward any airfoil. The differential pressure across the blade creates useful movement of the blade. When the wind changes direction so that the flow is no longer perpendicular to the blade, only a partial component of the wind produces useful energy. The rest of the energy generates bending stresses on the blades. These stresses cause damage to the structural material of the blades and eventually cause them to fail. Extremely high winds are also winds that contain higher gusts of variable direction and this is the normal reason for turning a turbine off as the wind creates damaging stresses that exceed the design limits of the blade. The embodiments disclosed herein intercept wind and reduce the flow of air that the blades experience by directing part of that wind that passes through the blades back against the blades. The components of the wind forces that are directed back to the blades stabilize the blade and smooth out the variability of the wind direction changes reducing the damaging wind components.

Extendable, inflatable, or mechanically deployable wall members or structures, which may also be referred to as wall members or structures or partial wall members or structures, are deployed and positioned behind blades 110 to address the wind vectors. Partial wind walls (PWW) may be as few as one member and as many as can be practically placed around the nacelle. As shown in FIG. 1, the PWW may be placed symmetrically about the rotation axis of the blades, such as PWW 500, 510, 520 and 530. The PWW may be extended 180 degrees opposite each other PWW. The PWW may also be placed asymmetrically at a position other than 180 degrees opposite another PWW. PWW may be substantially uniform in width in the front plane such as PWW 500 and PWW 510. PWW may be non-uniform in width such as those shown in PWW 520 and PWW 530 that both include a taper.

In one embodiment, deployment of the PWW is done by inflating the PWW. At wind speeds that exceed the design capacity of the turbine blades 110, a portion of the excess electric energy may be used to drive, for example, an air compressor. The air compressor inflates at least a portion of the structure of the wind wall device to increase its size behind the acting swept surface of the blades. Inflation continues until the wind speed in the vicinity of the blades returns to a safe level for the blades. If the wind drops below the maximum allowable value, the air compressor may be turned off and natural air pressure against the wind wall starts to collapse the wall. In this manner, the extent of deployment of the wind wall is controlled by wind speed in the vicinity of the wind turbine blades. The use of an air compressor and inflation is one example of a mechanism that can be directly related to the extent or absence of damaging winds on the blades. An auxiliary motor with either direct drive or a hydraulic system could also be employed. The PWW may also be deployed using a telescoping member or by pivoting the PWW about a mechanical joint positioned at the base end of the PWW.

A sensor 400 measuring wind speed, vibration or any other variable that are indicative of the need to reduce the rate of spin of blades 110 may be located on or near the support 200. The PWW structures are shown around the nacelle and positioned behind blades 110 relative to wind direction. The extendable arms (PWW) can be deployed via inflation, hydraulics, wind pressure, mechanical or fluid. Those of ordinary skill in the art will recognize that a balloon type structure may be filled by a variety of gaseous or liquid fluids to provide extension and to control rigidity. Materials suitable for such a deployable PWW structure include but are not limited to Mylar, laminates foils and plastic, rubber, rubberized foils, Kevlar, composites with multiple layers of formed fibers as cloth as used either alone or with polymer resin as a binding material. The essential nature of the material is that it act as a fluid barrier and upon inflation provide some level of selectable rigidity.

Figure 2A:
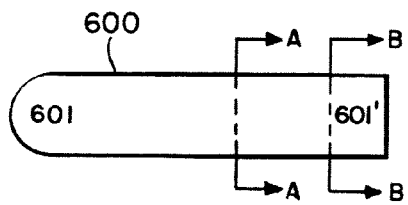
FIG. 2A is a front view of an extendable wall members or structures.
Figure 2B:
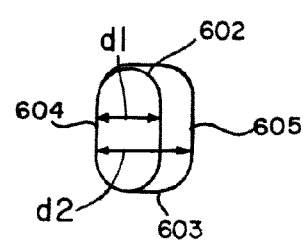
FIGS. 2B-2C are some examples of cross sectional profiles of an extendable wall member such as the one illustrated in FIG. 2A cut away along lines A-A and B-B.
Figure 2C:
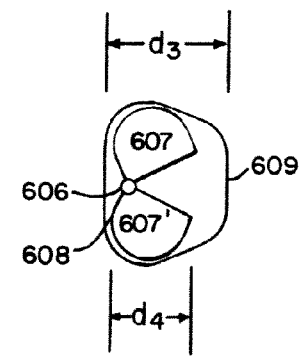

Shown in FIGS. 2A-2C are aspects of a configuration that may be used in constructing the PWW member or members. In some instance, a PWW member 600 such as that illustrated in FIG. 2A, which is shown as being substantially uniform in its side to side width may have also have a non uniform width. The indication in FIGS. 2A-2C of uniformity is not intended to be a limitation. Other aspects of an exemplar of PWW member 600 is illustrated with overlaid cross sectional portions. Cross sections are indicated near a remote end 601 and a base end 601'. In this example, the base end is nearest the nacelle. In FIG. 2B, the cross sectional profile 602 of PWW 600 near the remote end 601 is compared with cross sectional profile 603 nearer the base end 601'. While the side to side width is shown substantially uniform in some circumstances it is desirable to vary the front to back width wherein the distance "d1" from the front side 604 of PWW 600 to the back side 605 of PWW 600 are cross sectional profile 602 is shorter than the distance "d2" from the front side 604 to the back side 605 of cross sectional profile 603.

Shown in FIG. 2C is the cross sectional profile 606 of a variation of PWW 600 near the remote end 601 compared with cross sectional profile nearer the base end 601'. In this implementation, a first region nearer the remote end 601 includes a series of fluid chambers 607 and 607' formed with a center seam or rib 608. The chambers are fluidly connected to second region 609 of the PWW which is near the base end 601'. The cross sectional profile of the first region "d3" is overlaid onto the cross sectional profile of the second region 609 as shown in FIG. 2C. The profile of the first region which faces the back of the blades 110 is at least two radiused portions which are shaped to modulate, direct and other face alter the deflected wind.

Nothing in this disclosure is intended to limit a PWW having substantially smooth and or uniform shape and surfaces.

Figure 3A:
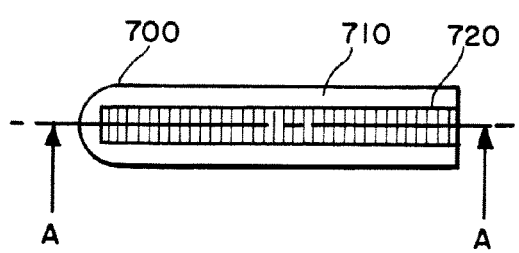
FIG. 3A is a front view of an extendable wall member.
Figure 3B:
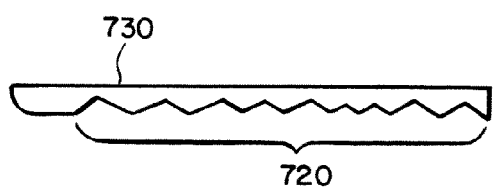
FIG. 3B is a cut-away view of FIG. 3A along line A-A.

Shown in FIGS. 3A-3B are aspects of configuration which may be used in constructing a PWW member or members. The PWW member 700 is illustrated in FIG. 3A as being substantially uniform in its side-to-side width. The indication in this illustration of uniformity is not intended to be a limitation. An exemplar of PWW member 700 with a cross sectional cut at A-A that bisects the PWW is shown in FIG. 3B.

The PWW 700 has outer section 710 which surrounds on at least three sides inner portion 720. Those of ordinary skill in the art will recognize that the disclosure has a scope which includes an inner section 720 that is surrounded on all four sides. They will further understand that inner section 720 may be a series of two or more discreet inner portions each surrounded by outer portion 710.

Shown in FIG. 3B is a cutaway of PWW 700, the back side 730 of the PWW (remote from the blades) may be smooth or it may have other ribbed features (not shown) that are consistent with supporting the inflated PWW. The cut away of inner section 720 shows its profile, which has a series of non-parallel zig zags. The zig zags may also be curves, divots, ribs, protrusions and the like. The inner section 720 profile faces the back of the blades and may be non-parallel to modulate, direct and other face alter the deflect wind.

Figure 4:
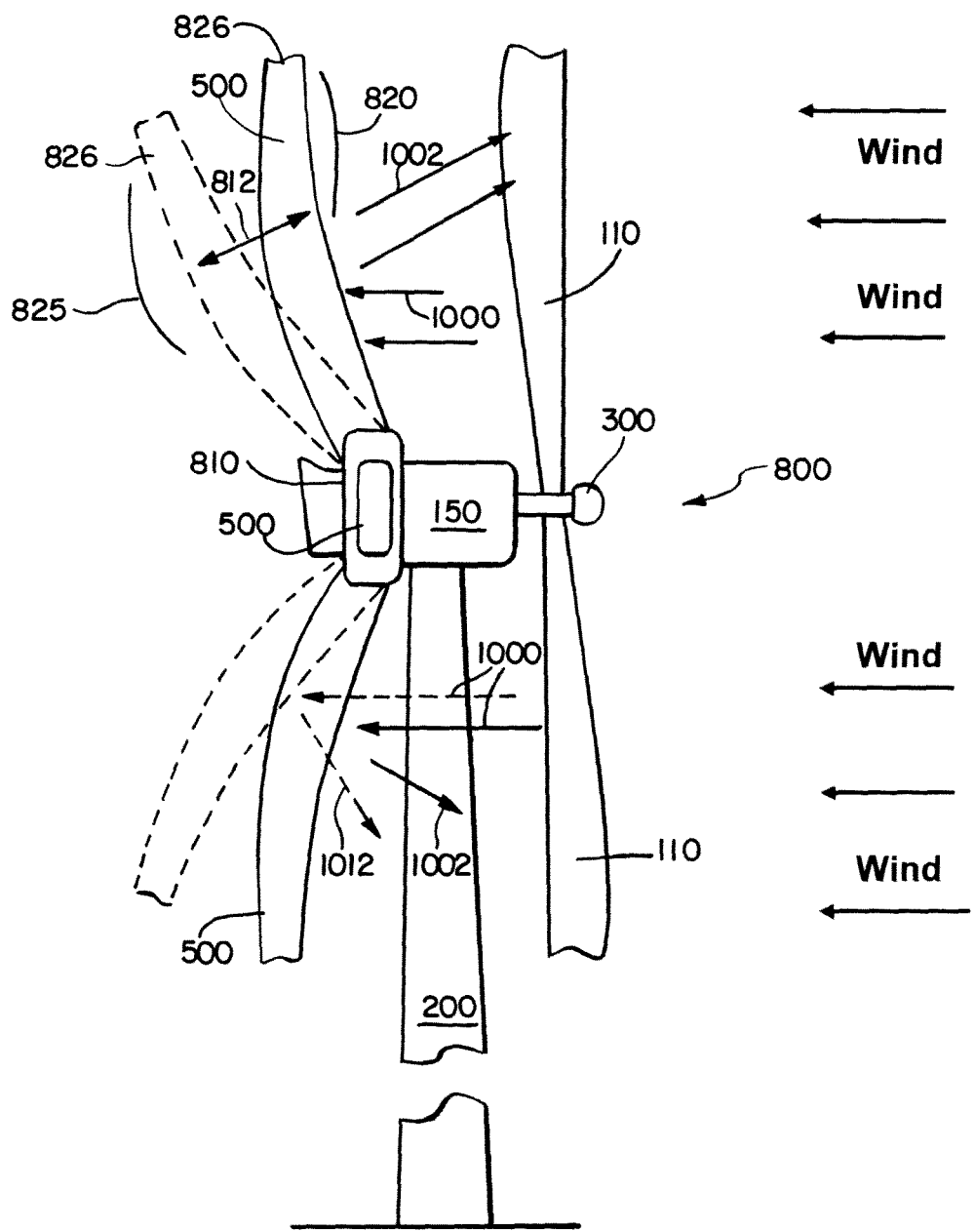
FIG. 4 is a partial side view of an exemplary implementation of a horizontal axis wind turbine (HAWT) with extendable wall members or structures.

Shown in FIG. 4 is a side view of a wind-energy conversion system, a wind capture, power apparatus, or otherwise a renewable energy device and system 800. In this implementation, the system is a HAWT comprising a drive or power unit 150 housed in a nacelle. The drive or power unit 150 includes components to support rotating blades 110, to turn a generator (not shown), to provide electricity and in many cases to allow for braking or lock down if the blade rotations needs to be slowed or stopped. Such drive structures also often have a yaw control to provide for movement of the drive unit 150 around the main support structure 200. A hub 300 which faces the wind is often affixed over the common connection point of the blades 110 to improve aerodynamics. Blades 110 spin or pivot around a shaft thereby turning the generator within the drive unit to generate electricity. In this implementation one or more extendable inflatable members (EIM) 500 and inflation pumps are shown around the nacelle 150 in a nacelle over-sleeve (NOS) 810 which may be added to an existing or new nacelle. The NOS may also be formed as part of a nacelle. The extendable PWW when retracted, may be designed to extend any desired percent of the blade length, for example, extend less than about 15 percent of the blade length and more preferably less than about 10 percent of the blade length and most preferably the PWW when retracted do not extend beyond NOS 810.

The extendable PWW 500 is shown extended in a first position 820. PWW 500 is movable along the path of arrow 812 to a second position 825. Selection of inflation rate, pressure and structure of the PWW is used to control the positions. The second position locates the remote tip 826 of the PWW further from the blades then they are in the first position 820. Some of the wind directed at the system 800 passes the blades 110 and reaches the PWW. Upon reaching the PWW along the line of arrows 1000, the wind may deflect along, for example, the lines of arrow 1002 (when the PWW is in the first position). Upon reaching the PWW along the line of arrows 1000, the wind may deflect along, for example, the lines of arrow 1012 (when the PWW is in the second position). A comparison of the vector at which the wind 1000 is deflected at said first position 820 to the vector at which the wind 1000 is deflected at the second position 825 shows that the angulations of the PWW can be used to direct the wind vectors. This direction of the wind vectors has multiple uses. One aspect of the direction is that a PWW that is at a position similar to position two (as compared to position one) can be shorter in length yet continue to impact the same amount of blade as a longer PWW would at position one. In addition, the sum of the vectors defines the actual wind speed impacting the blades 110. By controlling the deflected wind 1002 and 1012 the PWW may reduce the total wind speed impacting the blades 110 thereby keeping a system within nominal operating parameters even during wind that exceeds such parameters. The wind wall is deployed by the methods described above to always provide a safe operating wind regime on the blades and not to interfere with wind flow when the wind speeds are below the nominal top rated winds for operation of the turbine.

Figure 5:
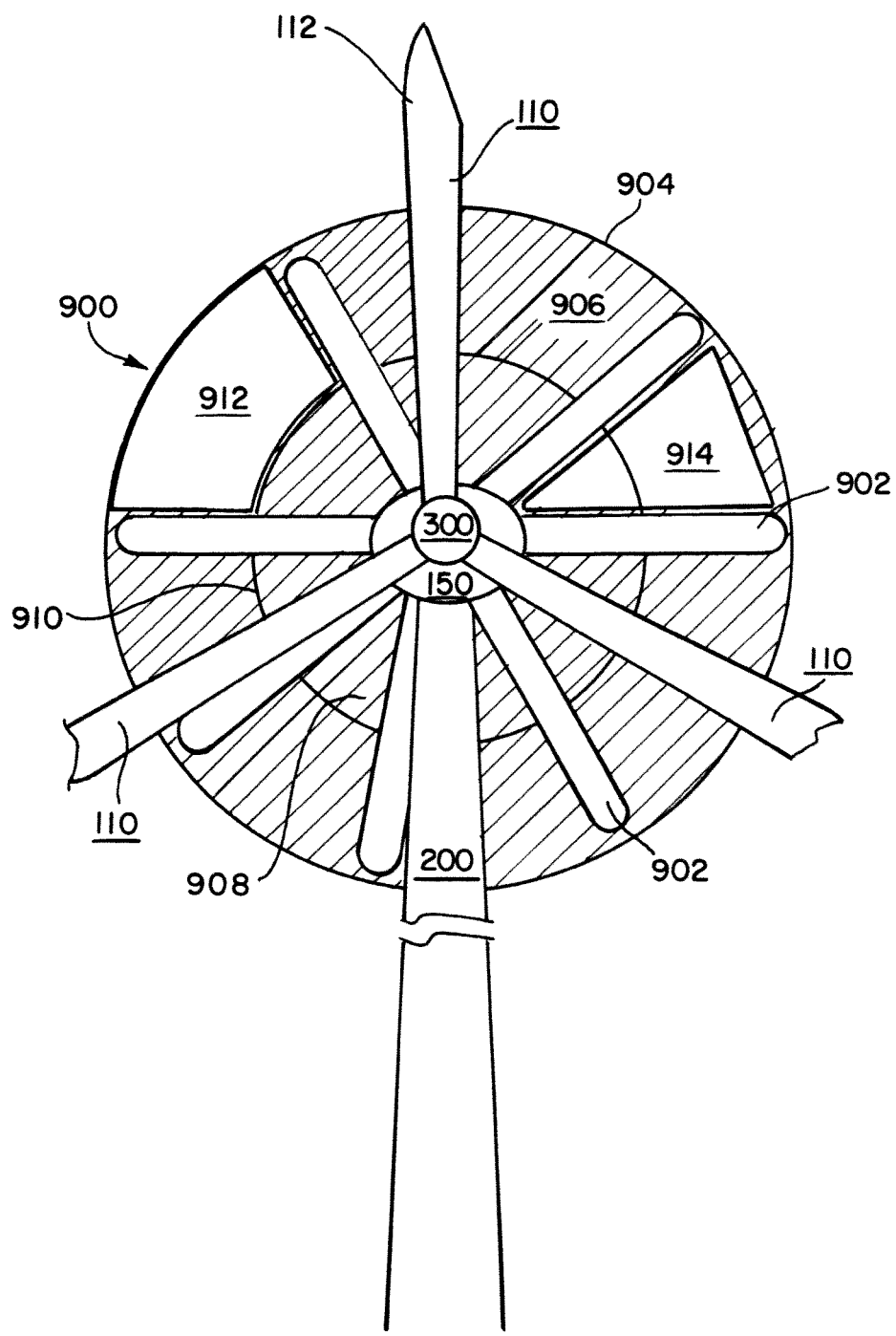
FIG. 5 is a partial front view of an exemplary implementation of a horizontal axis wind turbine (HAWT) with an extendable wall member or structures.

Shown in FIG. 5 is a front view of a wind-energy conversion system, wind capture, power apparatus, or otherwise a renewable energy device and system 900. The HAWT comprising a drive or power unit 150 housed in a nacelle is shown. The drive or power unit 150 includes components used to support the rotating blades 110, to turn a generator (not shown), to provide electricity and, in many cases, to allow for braking or lock down if the blade rotations needs to be slowed or stopped. A hub 300, which faces the wind is often affixed over the common connection point of the blades 110 to improve aerodynamics. In this implementation, extendable inflatable members (EIM) 902 are deployed about the nacelle 150. The EIM are also support structures for wind dish 904. The indication of the wind dish as circular is not a limitation and those of ordinary skill in the art will recognize that this disclosure applies to partial circles including any region of wall/barricade that is support at least partially by one or more EIM 902. The wind dish need not be inflatable. The wind dish may be a thin material. The wind dish material may be porous to allow a percentage of the wind directed at the wind dish to pass through.

Wind dish 904 is shown with concentric regions and sections. Concentric regions and sectioning are not essential. Concentric region one 906 is the outer region furthest from the nacelle 150. In some instance concentric region one 906 may be adequate to address wind speed issues without additional concentric regions. The wind speed affecting the blades 110 is different at different lengths from the axis of rotation. Higher wind speeds tend to provide lift form the blade near the remoter portions 112 of the blades 110. Accordingly, a first concentric section at an angular position (see description of FIG. 4) to the blades may deflect wind towards the remote portions 112 of the blades.

Concentric region two 908 is closer to the nacelle. A concentric support rib 910 is shown between regions one 906 and region two 908. Sections 912 and 914 may be constructed of materials with different characteristic than the other portions of the wind dish. Sections may be less porous, more porous, less ridged, more ridged, or of different curvature. The type of structure may be adapted to the location of the turbines relative to their surroundings. Turbines on the edge of steep gradients to their front, for example, experience more gusts that impinge a rotor system from below. Turbines that are placed closer together experience effects from adjacent turbines in the array depending on placement. The shape of the elements can be used to address these specific cases since they result in a predominance of damaging gusts from one direction.

Shown in FIGS. 6A-6D are views of a vertical axis wind turbine (VAWT) 950, which may be a wind capture device, a power apparatus, or a renewable energy device and system. The VAWT 950 comprising a drive or power unit 951. The drive or power unit 951 includes components to support vertical blades 952 around a vertical axis defined by a center post 960 for turning a generator (not shown) that provides electricity, and, in many cases, that allows for braking or lock down if the blade rotation needs to be slowed or stopped. The VAWT is shown on a main support structure 200 which may be optional should the VAWT be roof or other structure mounted.

The blades 952 are indicated at least partially between a top structure 953 and bottom structure 954, each of which may be a ring or disk. A bottom end of each blade 955 and top end of each blade 956 are fixed. The fixing may allow rotation of the blade or it may have the blade surface immovable relative to the top structure 953 and bottom structure 954. Those of ordinary skill in the art will recognize that there are a variety of blade configurations used in the VAWT, some having moving blades others with immovable blades. Additionally, in some instance the top structure 953 and bottom structure 954 may be eliminated, and the blades will be affixed to the center post 960 at the top and bottom or with intermediary supports (not shown). At least one (bottom) bearing assembly 962 which may be part of the generator within the power unit 951 (or which may be separate) is interposed between the spinning blades and the generator. In some instances, an additional or top bearing assembly 963 may be placed between the blades and center post 960.

Figure 6A:
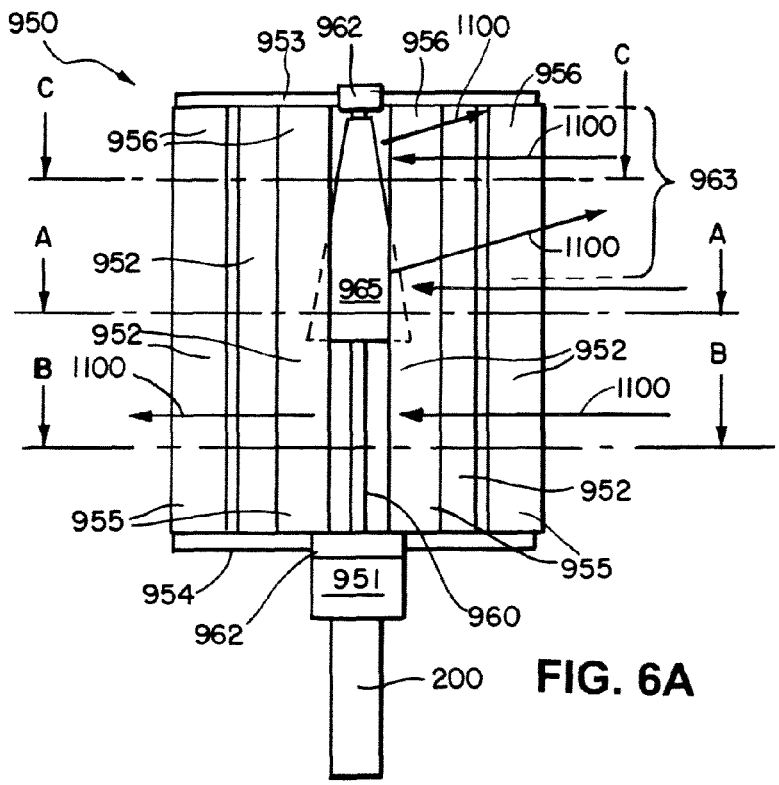
Figure 6B:
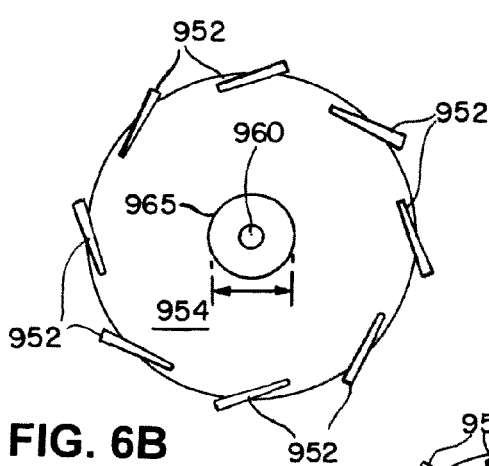
Figure 6C:
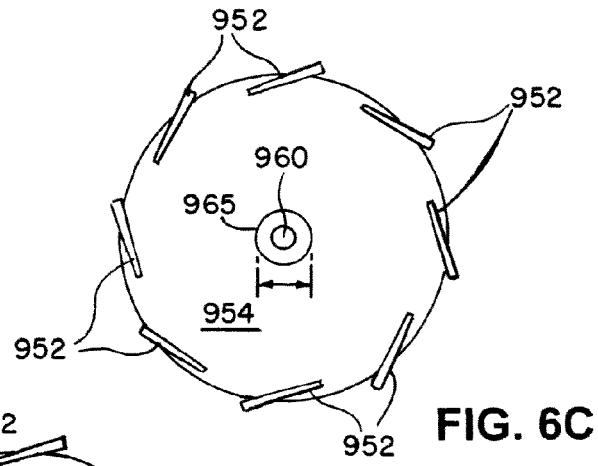
Figure 6D:
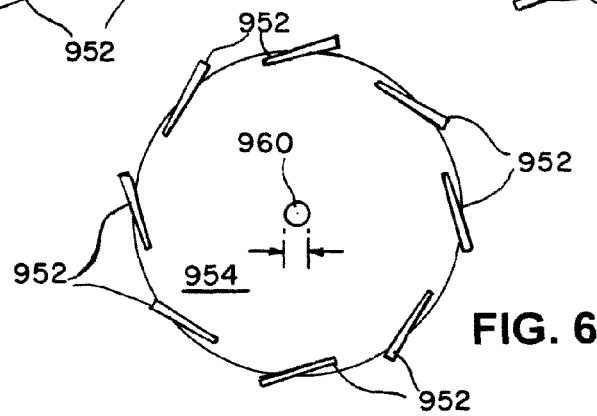

The sum of the wind supplied force 1100, which impacts the blades 952 may be reduced as it impacts a specific section of the blades 963 via a shaped partial wind wall cone 965 wherein the cone angle deflects back 1110 a portion of the wind 1100 at the blades' back surface. The wall cone 965, as indicated in FIGS. 6B and 6C, may be of varying diameter. For example, the diameter through the cone profile at line A-A of FIG. 6A is greater than the diameter through the cone profile at line C-C. The varying diameter may be adjusted to provide a wall cone 965 with a surface angled to deflect wind at the blades in a predetermined fashion. The wall cone, as noted in reference to the partial wind wall may be inflatable or may be mechanically or otherwise solid and left deployed.

Additionally, because a VAWT may be subjected to a constant differential of wind speed (force) from the bottom structure 954 up towards the top structure 953, a wall cone can equalize the wind forces applied to the top structure 953 and bottom structure 954, respectively, or at least substantially reduce the force differential between top and bottom, thereby to distribute more evenly the load being applied to the VAWT. This reduces wear on bearing components due to the VAWT applying an off-axis torque to the bearing assembly or assemblies corresponding to the wind differential. In the normal high load operation of a VAWT there is always a stress applied to the top bearing assembly 963 from the wind impinging on one side of the turbine. These loads are very damaging at the high wind speeds. Since the deployment of the wall cone reduces the wind from the impinging direction (arrows 1100) by providing a reverse wind direction (arrows 1110), it reduces the load (stress) on the top bearing. This can result in reduced maintenance costs and longer life for the turbine.

Since certain changes may be made in the above apparatus without departing from the scope of the invention herein involved, it is intended that all matter contained in the above description, as shown in the accompanying drawings, shall be interpreted in an illustrative sense, and not a limiting sense.

We claim:

1. A method of reducing load on a bearing assembly of a vertical axis wind turbine (VAWT) having blades disposed about a vertical axis, each of the blades having a top portion and a bottom portion, the method comprising:
    placing a shaped wall cone around a portion of the vertical axis; and,
    deflecting wind from the wall cone toward the blades, whereby the deflection substantially reduces an applied wind force differential between the top and bottom portions of the blades.

2. The method of claim 1, wherein the deflecting reduces wear on the bearing assembly of the VAWT that results from an off-axis torque applied to the bearing assembly corresponding to a wind force differential in the absence of the shaped wall cone.

3. The method of claim 1, wherein the bearing assembly comprises a top bearing assembly and a bottom bearing assembly, and wherein the wall cone is configured to reduce the force of wind from an impinging direction by providing a reverse wind direction that reduces the load on the top bearing assembly of the VAWT.

4. A method of reducing load on a top bearing assembly of a vertical axis wind turbine (VAWT) having blades disposed about a vertical axis, the method comprising:
    placing a deployable wall cone around a portion of the vertical axis;
    acquiring sensor data that are indicative of a need to reduce forces applied to a portion of the blades;
    using the sensor data to determine deployment of the wall cone; and,
    deploying the wall cone behind the blades so as to reduce load forces exerted on a portion of the blades.

5. The method of claim 4, wherein the wall cone is configured to reduce a force of wind from an impinging direction by providing a reverse wind direction that reduces the load forces on the top bearing assembly.

6. A wind power generation system comprising:
    a wind turbine having at least one blade and affixed to a support tower; and
    a deployable wall member coupled to the wind turbine, the deployable wall member comprising an extendable inflatable member that is movable between a first position in which a remote tip of the deployable wall member is at a first location relative to the at least one blade, and a second position in which the remote tip is further from the at least one blade than in the first position.

7. The wind power generation system of claim 6, further comprising a nacelle, wherein a plurality of extendable inflatable members are placed symmetrically around said nacelle.

8. The wind power generation system of claim 6, further comprising a nacelle, wherein a plurality of extendable inflatable members are placed asymmetrically around said nacelle.

9. The wind power generation of claim 6, wherein the extendable inflatable member has two or more fluid chambers.

10. The wind power generation system of claim 6, further comprising a wind dish connected to and deployed by the extension of said extendable inflatable member.

11. A wind power generation system comprising:
    a nacelle;
    a wind turbine having at least one blade;
    said wind turbine being affixed to a support tower; and
    at least one deployable wall member coupled to at least one of the nacelle and the wind turbine, the deployable wall member being extendable by inflation from a first position to a second position so as to be moveable to deflect a first wind vector passing through the blade of the wind turbine along a first path when the deployable wall member is in the first position, and to deflect a second wind vector passing through the blade of the wind turbine along a second path when the deployable wall member is in the second position.

12. The wind power generation system of claim 11, wherein each of the first path and the second path comprises a vector path including a component directed toward the at least one blade.

13. The wind power generation system of claim 11, further comprising a wind dish connected to and deployed by the extension of said at least one deployable wall member.

14. A method of buffering high wind loads on the blades of a wind turbine, the method comprising:
acquiring sensor data that are indicative of the need to reduce the rate of spin of the blades;
using the sensor data to determine deployment of a partial wind wall structure; and
deploying, by inflation, an extendable wall structure behind the blades so as to reduce the rate of spin of the blades.

* * * * *